Feb. 24, 1970         G. R. MILLER         3,497,198
SHOCK ABSORBER AND AIR SPRING ASSEMBLY
Filed Dec. 15, 1967                  2 Sheets-Sheet 1
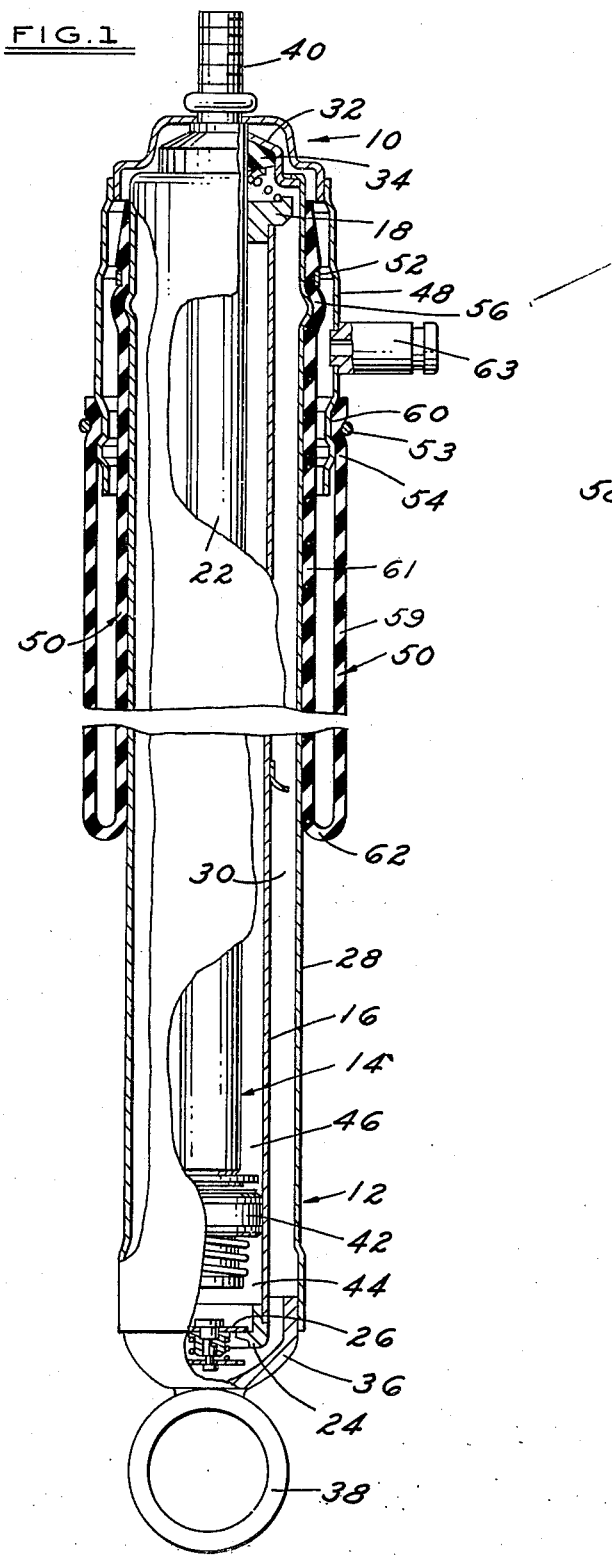
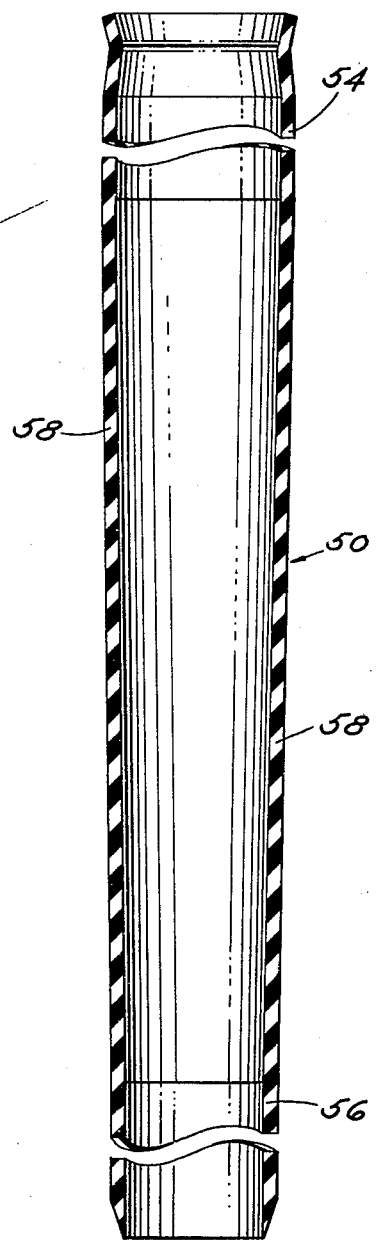
GERALD R. MILLER
INVENTOR
BY John R. Faulkner
Clifford L. Sadler
ATTORNEYS Feb. 24, 1970   G. R. MILLER   3,497,198
SHOCK ABSORBER AND AIR SPRING ASSEMBLY
Filed Dec. 15, 1967   2 Sheets-Sheet 2
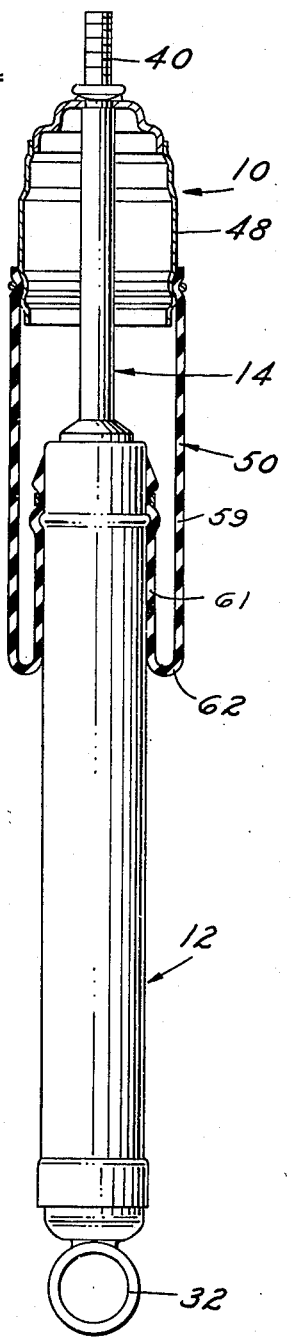
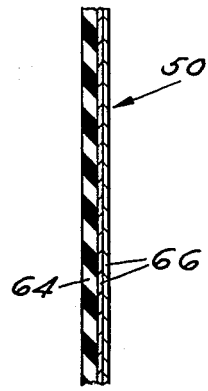
GERALD R. MILLER
INVENTOR
BY John R. Faulkner
Clifford L. Sadler
ATTORNEYS

United States Patent Office 3,497,198
Patented Feb. 24, 1970

3,497,198
SHOCK ABSORBER AND AIR SPRING ASSEMBLY
Gerald R. Miller, Northville, Mich., assignor to Ford Motor Company, Dearborn, Mich., a corporation of Delaware
Filed Dec. 15, 1967, Ser. No. 690,893
Int. Cl. F16f 9/08
U.S. Cl. 267—35                     10 Claims

ABSTRACT OF THE DISCLOSURE

A shock absorber and air spring assembly having an annular, flexible air sleeve member formed with a tapered portion so that when installed about the shock absorber no rubbing contact occurs between the inner and outer walls of the flexible air sleeve member even when the air spring portion of the assembly is at atmospheric pressure.

BACKGROUND OF THE INVENTION

In a conventional automotive vehicle suspension system, the sprung mass is separated from the unsprung mass by springs and shock absorbers. The springs must be firm enough to provide safe and responsive handling, yet as soft as possible to provide a comfortable and smooth ride. The selection of spring rate is complicated by the additional fact that a lightly loaded vehicle and a heavily loaded vehicle require significantly different spring rates to obtain the best combinations of handling and ride. It is thus seen that the choice of spring rate in a conventional automotive vehicle suspension system is, at best, a significant compromise of design objectives.

Supplementary springs in which the spring rates may be varied depending upon the load weight of the vehicle provide some solution to the above problem. It is known in the art to provide such variable rate supplementary springs in the form of air sleeves concentrically positioned about tubular, direct acting hydraulic shock absorbers. In these prior art devices, a flexible tubular wall member or air sleeve is attached at its one end to the shock absorber body. The other end is reversed or folded about the remainder of the flexible wall member and secured to move with the shock absorber piston rod. As the inner wall of the flexible wall member moves with the shock absorber body and the outer wall moves with the piston rod, the fold changes position along the flexible wall member to adjust the relative lengths of the inner and outer wall portions. The flexible wall member forms part of a sealed enclosure in which the air pressure may be varied to provide a range of spring rates.

A common disadvantage occurring in many prior art devices is that when the air pressure in the enclosure drops below a certain level or to atmospheric pressure, rubbing and scuffing occurs between the inner and outer walls of the flexible wall portions. Furthermore, friction between the relatively moving inner and outer walls causes bunching and pinching of the flexible wall member near its annular fold. Such scuffing and pinching significantly shortens the life of the flexible wall member.

The present invention eliminates the aforementioned problems and increases the useful life of the flexible wall member by preventing contact between its inner and outer walls even during conditions of underinflation.

BRIEF SUMMARY OF THE INVENTION

A shock absorber and air spring assembly constructed in accordance with this invention includes a direct acting tubular type telescopic shock absorber having a main body portion and a piston rod protruding upwardly from the main body portion and axially movable relative to it. A rigid tubular unit is secured to the protruding end of the piston rod and extends axially toward the body portion. When the shock absorber is in its retracted position, the rigid tubular unit concentrically surrounds the upper portion of the main body portion. A flexible wall member or air sleeve unit is attached to the main body portion near its upper end and extends downwardly away from the protruding piston rod end. The free end of the flexible wall member is turned inside out and secured to the unattached end of the rigid tubular unit. The flexible wall member thus takes on an annular envelope shape having an inner wall, an outer wall, and an intermediate annular fold which changes position as the shock absorber moves from jounce to rebound. In a free, uninstalled condition the flexible air spring sleeve is essentially tubular in shape having a larger diameter portion, a smaller diameter portion and a tapered portion intermediate the larger and smaller diameter portions. The end of the smaller diameter portion is secured to the shock absorber body while the end of the larger diameter portion is fastened to the rigid tubular unit. The diameter differential and the tapered diameter section provide a natural resiliency to the flexible air sleeve member while in its installed position so as to prevent contact between the inner and outer walls of the flexible member whether inflated or not and thereby to eliminate scuffing and pinching of the flexible member.

BRIEF DESCRIPTION OF THE DRAWINGS

FIGURE 1 is an elevational view with portions broken away and in section of a shock absorber and air spring assembly showing the flexible air spring sleeve in an installed, but uninflated, position. The piston rod portion is in a fully retracted position relative to the shock absorber main body portion.

FIGURE 2 is a cross-sectional view of the flexible air spring unit in its free uninstalled position showing the larger diametered portion, the smaller diametered portion and the intermediate tapered portion.

FIGURE 3 is an elevational view with parts in section of a shock absorber and air spring assembly in a partially extended position.

FIGURE 4 is a cross section of a wall segment of the flexible air spring unit.

DESCRIPTION OF THE PREFERRED EMBODIMENT

Referring now to the drawings for a more complete understanding of the present invention, FIGURE 1 discloses a shock absorber and air spring assembly 10 for use in the automotive vehicle suspension system. A shock absorber main body portion is referred to generally by reference numeral 12, and a piston and rod assembly is referred to generally by reference numeral 14.

The body portion 12 includes a pressure cylinder 16. The upper end of the pressure cylinder 16 is closed by a rod guide 18 which slidably receives a piston rod 22. The bottom end of the pressure cylinder 16 is closed by an end portion 24 containing a foot valve 26. A reservoir tube 28 concentric with the pressure cylinder 16 is situated about the pressure cylinder and forms an elongated annular reservoir chamber 30. The foot valve 26 permits communication between the reservoir chamber 30 and the volume within pressure cylinder 16.

The reservoir tube 28 is closed at its upper end by an end portion 32 and seal 34 which slidably engages the piston rod 22. The reservoir tube 28 is closed at its lower end by an end portion 36 which carries a mounting ring 38 for use in attaching the assembly to the vehicle suspension system.

The piston and rod assembly 14 consists of a piston rod member 22 having a protruding threaded end 40 which may be secured to the sprung portion of the automotive vehicle. On the other end of the piston rod 22 is a valved piston head 42 which slidably engages the inside of the pressure cylinder 16 and which divides the pressure cylinder into a compression chamber 44 and a rebound chamber 46. The valved piston head 42 permits a controlled flow of hydraulic fluid from the compression chamber 44 to the rebound chamber 46 and vice versa.

Secured to the protruding end portion of piston rod 22 and concentric with both the pressure cylinder 16 and the reservoir tube 28 is a rigid tubular wall unit 48 that extends partially the length of the shock absorber body portion 12 when the assembly 10 is in a retracted position. The rigid tubular wall unit 48 is secured to the protruding end of the piston rod 22 and moves relatively to the body portion 12 of the shock absorber during jounce and rebound of the vehicle. An air sleeve or flexible tubular wall means 50 is secured adjacent its one end about the shock absorber body 12 by a metal band 52 and at its other end about the rigid tubular wall unit 48 by another band 53.

In a free, uninstalled state, the flexible tubular wall means 50 has a larger diameter portion 54, a smaller diameter portion 56, and an intermediate portion 58 having diminishing diameters from the larger diameter of portion 54 to the smaller diameter of portion 56. The inside diameter of the larger diameter portion 54 is approximately of the same length as the outer diameter of the rigid wall unit 48 at reference numeral 60, but sufficiently less so the flexible wall means fits snugly over the rigid wall unit when installed as shown in FIGURE 1. Likewise, the inside diameter of the smaller diameter portion 56 of the flexible wall means 50 is approximately equal to the outside diameter of the reservoir tube 28, but sufficiently less so the smaller diameter portion fits snugly over the reservoir tube.

When installed and at atmospheric pressure, the large end 54 of the flexible wall unit 50 is doubled over or reversed about its remainder so that the larger diameter portion 54 forms a substantially cylindrical outside wall 59 and the smaller diameter portion 56 forms a substantially cylindrical and concentric inside wall 61. Wall 59 is at all times spaced apart from wall 61. The outer and inner walls are connected by an intermediate fold designated by reference numeral 62. As the shock absorber functions in jounce and rebound, the fold travels along the tapered, intermediate portion 58 of the flexible wall means 50.

Such a flexible wall unit constructed with a larger diameter portion, a smaller diameter portion, and an intermediate tapered portion provides a natural resiliency when the flexible wall unit is installed about a shock absorber so that the inner wall at no time contacts the outer wall, even under conditions of underinflation.

An air valve 63 is mounted in the rigid tubular wall unit 48 permitting the air pressure within the annular enclosure defined in part by unit 48 and the flexible wall member 50 to be varied according to the desired spring rate.

FIGURE 4 illustrates the cross-sectional construction of a preferred embodiment of the invention showing an enlarged cross-sectional view of a wall segment of the flexible air sleeve 50. A neoprene liner 64 is reinforced by two plies of fabric 66.

The foregoing description presents the presently preferred embodiment of the invention. Modifications and alterations will occur to those skilled in the art that are included within the scope and spirit of the following claims:

1. A shock absorber and air spring unit assembly comprising:
 a direct acting tubular type telescopic shock absorber including a main body portion, a piston rod axially movable relative to said main body portion and protruding from the upper end thereof,
 rigid wall means secured to the upper portion of said piston rod,
 a flexible wall means,
 said flexible wall means in its free, uninstalled state having a generally tubular shape and including a larger diameter portion, a smaller diameter portion, and an intermediate tapered portion,
 means securing said smaller diameter portion about the upper part of said main body portion,
 means securing said larger diameter portion about said rigid wall means,
 said flexible wall means being folded over upon itself to form substantially concentric inner and outer wall portions,
 said inner and outer wall portions being connected by a fold portion constructed to traverse part of said intermediate portion when said rigid wall moves relative to the body portion during operation of the shock absorber,
 said flexible means comprising a part of an inflatable air spring unit.

2. A shock absorber and air spring assembly according to claim 1 and including:
 said outer wall portion being spaced from said inner wall portion when said spring unit is at atmospheric pressure.

3. A shock absorber and air spring unit assembly comprising:
 a direct acting tubular type telescopic shock absorber including a main body portion, a piston rod axially movable relative to said main body portion and protruding from the upper end thereof,
 a rigid tubular wall unit secured to the upper end of said piston rod and extending axially toward said main body portion,
 a flexible wall means,
 said flexible wall means in its free, uninstalled state having a generally tubular shape and including a larger diameter portion, a smaller diameter portion, and an intermediate tapered portion,
 means securing said smaller diameter portion about the upper part of said main body portion,
 means securing said larger diameter portion about the lower end of said rigid tubular wall unit,
 said flexible wall means being folded about itself to form substantially concentric inner and outer wall portions, said inner and outer wall portions being connected by a fold portion constructed to traverse part of said intermediate portion when said rigid wall unit moves axially relative to said main body portion during operation of the shock absorber,
 said rigid tubular unit and said flexible tubular unit forming, in part, an inflatable air spring enclosure.

4. A shock absorber and air spring unit assembly as described in claim 3 and including:
 said smaller diameter portion fitting snugly about the surface of said main body portion.

5. A shock absorber and air spring unit assembly as described in claim 3 and including:
 said larger diameter portion of said flexible wall unit when uninstalled having an outside diameter essentially equal to the outside diameter of said rigid tubular wall unit.

6. A shock absorber and air spring unit assembly as described in claim 3 and including:
 an air valve in said rigid tubular wall unit through which pressurized air may be supplied to said enclosure.

7. A shock absorber and air spring unit assembly as described in claim 3 and including:
 said flexible tubular wall unit when uninstalled having substantially uniform wall thickness.

8. A shock absorber and air spring unit assembly as described in claim 3 and including:
   said rigid tubular wall unit having an axial length not greater than the stroke of reciprocation of said piston rod relative to said main body portion.
9. A shock absorber and air spring unit assembly as described in claim 3 and including:
   said smaller diameter portion of said flexible wall unit having an inside diameter essentially equal to the outside diameter of said main body portion.
10. A shock absorber and air spring unit assembly as described in claim 9 and including:
    said larger diameter portion of said flexible wall unit when uninstalled having an outside diameter essentially equal to the outside diameter of said rigid tubular wall unit, whereby the diminishing diameters of the intermediate portion of said flexible wall unit bias the inner and outer walls thereof radially apart when installed and thereby preventing contact, scuffing and tearing of the areas of the intermediate portion near the annular U-shaped fold.

References Cited

UNITED STATES PATENTS 3,046,002   7/1962   Schmitz.

FOREIGN PATENTS 1,156,571   5/1958   France.

JAMES B. MARBERT, Primary Examiner